United States Patent Office 2,768,196
Patented Oct. 23, 1956

2,768,196

PRODUCTION OF OMEGA-HALOGEN CARBOXYLIC ACID NITRILES

Hans Huemer and Hermann Schulz, Frankfurt am Main, Germany, assignors to Deutsche Gold- und Silber-Scheideanstalt vormals Roessler, Frankfurt am Main, Germany No Drawing. Application March 29, 1954,
Serial No. 419,574

Claims priority, application Germany April 2, 1953

8 Claims. (Cl. 260—465.3)

The present invention relates to an improved process for the production of omega-halogen carboxylic acid nitriles.

In the past, it has been customary to produce such nitriles from bifunctional alkane derivatives whose functional groups were positioned at the ends of the chain. These compounds correspond to the following general formula:

$$X-(CH_2)_n-Z$$

in which $n$ is an integer and X and Z can be Cl, Br, OH, $CH_2=CH-$, COOH, and CN. For example, 1,4-dichlorobutane, 1,6 - hexanediol, 1,11 - undecylenic acid, acrylonitrile and the like have been employed as starting materials for the production of omega-halogen carboxylic acid nitriles. In each instance, the starting materials were rather expensive and in most instances a multi-step procedure producing poor yields was necessary.

It has now been unexpectedly found, according to the invention, that omega-halogen carboxylic acid nitriles can be produced in good yields in a single step process from olefins, especially ethylene, and cyanogen halide, both of which are comparatively easily obtainable and relatively inexpensive.

It is already known that certain compounds will form addition products with free radicals produced from olefins. Such addition reaction proceeds, in that the cleavage products of the addend are taken up as terminal groups of the olefin or olefin polymer. For example:

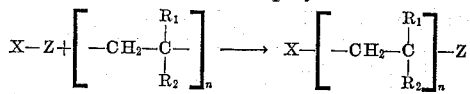

in which $n \geq 1$.

This type of conversion has been designated as telomerization. The Anglo-Saxon literature for example, describes reactions between polymerizing olefins and methyl halides, phosphorus halides, silicon halides, acetaldehyde, malonic acid derivatives and mercaptans. The addition is effected through a reaction mechanism which primarily depends upon the formation of the free radicals which occur during polymerization of olefins with the aid of known catalysts.

The reactivity of the previously suggested compounds which function as the addends is rather variable and no general rule could be formulated for the addition of certain groups at the ends of a chain formed during polymerization. For example, it could not be foreseen that, while a halogenated methane derivative such as carbon tetrachloride which splits into Cl— and CCl₃, easily adds on to the ends of a polymerizing chain, on the other hand, another halogen derivative of methane, phosgene, has absolutely no tendency to react analogously. In the latter instance only polymerized olefin is obtained. Even though phosgene, which can be considered the chloride of chloro formic acid, does not enter into telomerization reactions it was unexpectedly discovered according to the invention, that the nitriles of chloro-formic acid, namely, cyanogen chloride and cyanogen bromide can be added to olefins with excellent results. This was the more unexpected, because the tendency of cyanogen chloride to form chlorine and dicyan after splitting of cyanogen chloride into Cl— and —CN radicals is so great that it could not be foreseen that such free radicals would add to the olefin or olefin polymer. For example, when cyanogen chloride is heated in the presence of catalysts which loosen the halogen-carbon bond and ethylene, no addition according to the following addition reaction is obtained:

$$ClCN + CH_2=CH_2 \rightarrow ClCH_2-CH_2-CN$$

Quite to the contrary, practically quantitative yields of ethylene dichloride and dicyan are obtained according to the following equation:

$$2ClCN + CH_2=CH_2 \rightarrow ClCH_2-CH_2Cl + CN-CN$$

(see the co-pending application Serial No. 417,944, filed March 22, 1954, now U. S. Patent 2,723,185).

On the other hand, when a cyanogen halide is permitted to act on ethylene in the presence of radical forming polymerization catalysts, good yields of omega-halogen carboxylic acid nitriles of the following formula are obtained:

$$Halogen-(CH_2-CH_2)_n-CN$$

Wherein $n \geq 1$.

The length of the paraffinic chain depends upon the quantity of catalyst employed, the temperature, the pressure and ratio of cyanogen halide to ethylene, and can be varied within wide limits. Mixtures of polymeric homologues are obtained, which are easily separated, in view of the fact that the difference in boiling point of sequential chloronitrile homologues is sufficiently wide.

The process according to the invention may also be employed with olefins in which individual hydrogen atoms have been replaced by aliphatic, aromatic, araliphatic or heterocyclic radicals.

Catalysts of such systems which are able to promote free radical formation, such as peroxides, redox catalysts, and aliphatic azo compounds, can be employed for the process, according to the invention. For example, good results are obtained with organic peroxides, such as benzoyl and diacetyl peroxide. As redox system catalysts combinations of such peroxides with amines, preferably tertiary amines have been found, well suited. The catalytic activity can be increased even further if compounds containing tetravalent sulfur such as sulfinic acid, sulfinic acid salts and sulfinic acid derivatives are also included in addition to the amines. When such tetravalent sulfur compounds are included in the catalyst system, the quantity of peroxide can be reduced considerably. The secondary or tertiary amine salts of sulfinic acid can, for example, be employed to accelerate the catalyst. Those sulfinic acid derivatives which contain amino groups, for example, sulfincarbinolamines, such as, paratoluolsulfincarbinoldimethylamine are suited as catalyst accelerators. In some instances, the presence of very small amounts of heavy metals, such as copper, manganese, cobalt and lead or their compounds has been found favorable. Suitable aliphatic azo compound catalysts are for example, as follows: azoisobutyric acid nitrile, azoisobutyric acid dimethyl ester, azodiethylacetic acid dinitrile and azocyclohexane carboxylic acid nitrile.

The process according to the invention can be carried out continuously or as a batch process, either in the presence or absence of solvents. A batch process can, for example, be carried out as follows: A solution of cyanogen chloride in toluene is placed in an autoclave with the addition of 1 to 5% of benzoyl peroxide and ethylene is introduced until a pressure of 80–100 atmospheres is reached and the autoclave is gradually heated to 90 to 100° C. The reaction is interrupted, when no more decrease of pressure is observed. After the pressure is relieved and the cyanogen chloride and toluene which does not react, are distilled off, a mobile liquid remains which is a mixture of omega-chlorocarboxylic acid nitriles which essentially consists of the adducts $$Cl—(CH_2—CH_2)_n—CN$$

wherein $n=1–6$. The cyanogen chloride which does not react is recovered unchanged and can be reused for a further batch.

It is advantageous for commercial production to carry out the process continuously by passing the reactants in the absence of a solvent through a tube at a temperature between about 100 to 200° C. Expediently the tube is of stainless steel and such tube is filled with filling bodies of the same material. The tube is held under an ethylene pressure of 100 to 200 atmospheres and cyanogen chlorides containing about 0.3 to 3% of azobutyric acid nitrile in dissolved form, is pumped through the tube containing the filling bodies. Under these conditions, a quantity of telomerizate is obtained depending on the volume of the reaction tube and the gas velocity. When the throughput is about 2 kilograms of cyanogen chloride per hour, per liter of reaction space about 150 to 200 grams of a mixture of chlorocarboxylic acid nitriles are obtained per hour. In order to simplify the recovery of the nitriles produced their concentration can be increased by recycling. For example, the condensate leaving the reaction space is recycled to the head of the system and mixed with fresh cyanogen chloride containing fresh catalyst. The pressure in the reaction space is maintained constant by pumping in fresh ethylene according to the amount consumed. So much of the telomerizate is continuously withdrawn from the cycle that the concentration of the mixture of chloronitriles in the reaction product amounts to 30–50%. The reaction product which is withdrawn is easily separated into cyanogen chloride and a mixture of chloronitriles by known means; and the unreacted cyanogen chloride is returned to the cycle. The reaction conditions given above are only given by way of example and are not limitative. The reaction conditions can be varied over wide limits and depend to a certain extent upon whether a batch or continuous process is used and what products primarily desired. Generally temperatures between 50 and 180° have been found suited for the process. However, the reaction is more easily controlled in a batch process when temperatures between 50° and 150° C. preferably between 50° C. and 120° C. are employed, whereas, when continuous process is employed, higher temperatures for example, between 120 and 180° C., can be employed in view of the relatively smaller quantities of reactants and reaction products present at any one time in the reaction space. The preferred pressures at which the process is carried out are between about 50 and 500 atmospheres.

The omega-chloro-carboxylic-acid-nitriles produced are of considerable importance as raw materials in the synthetic resin and synthetic fiber fields. They can be easily converted into omega-amino-carboxylic-acids, omega-dicarboxylic-acids and omega-dinitriles or -diamines.

The following examples will serve to illustrate several modifications of the process according to the invention.

*Example 1*

250 cc. of liquid cyanogen chloride, 200 cc. of toluene and 10.5 g. of azoisobutyric-acid-nitrile were introduced into a 1 liter autoclave of V₂A steel. After cooling the autoclave to about −15 to −20° C., the air was removed by pumping in nitrogen to a pressure of about 4 atmospheres three times. Thereafter the temperatures of the autoclave was permitted to rise to room temperature and ethylene was introduced until a pressure of 90 atmospheres was reached. The temperature was then gradually raised over a period of one hour to 100 to 110° C. and the autoclave maintained at this temperature for a further hour. The maximum pressure occurring was 500 atmospheres. After cooling the autoclave, it was opened and found to contain a mobile solution. The unconverted cyanogen chloride was distilled off at atmospheric pressure and the distillation was then continued under vacuum whereby toluene and the following fractions were obtained:

32.6 g. colorless oil B. P. 61–77° C. 3 mm. Hg
56.7 g. light yellow oil B. P. 77–158° C. 3 mm. Hg
8.7 g. yellow oil B. P. 158–207° C. 3 mm. Hg
3.8 g. residue The distillates were composed of a mixture of omega chlorocarboxylic acid nitriles of the formula $$Cl—(CH_2—CH_2)_n—CN, \ n=1–5$$

*Example 2*

90 cc. of liquid cyanogen chloride and 3.8 g. of azoisobutyric acid nitrile were introduced into a 400 cc. autoclave of Siemens-Martin steel and the air removed as described in Example 1. Ethylene was then introduced at room temperature until a pressure of 100 atmospheres was reached. The temperature was raised over a period of one hour to about 120° C. and this temperature was maintained for another hour. The maximum pressure reached was 470 atmospheres, and the quantity of ethylene taken up was 60 atmospheres measured after cooling. The reaction mixture was then distilled at atmospheric pressure to remove the unconverted cyanogen chloride and the remaining liquid was then distilled under vacuum to obtain the following fractions:

17.1 g. colorless oil B. P. 55–102° C. 2 mm. Hg
12.7 g. almost colorless oil B. P. 102–150° C. 2 mm. Hg
9.8 g. yellow oil B. P. 150–231° C. 2 mm. Hg
4.0 g. residue The distillates were composed of a mixture of omega chlorocarboxylic acid nitriles. $Cl—(CH_2—CH_2)_n \ CN$, $n$ predominantly $=1–7$.

*Example 3*

90 cc. of liquid cyanogen chloride and 3.8 g. of benzoyl peroxide were introduced into a 400 cc. autoclave of Siemens-Martin steel and the air removed as described in Example 1. Ethylene was then introduced at room temperature until a pressure of 90 atmospheres was reached. The temperature was raised over a period of one hour to 120° C. and this temperature was maintained for another hour. The following fractions were recovered from the reaction mixture after removal of the unreacted cyanogen chloride:

9.2 g. colorless oil B. P. 45–79° C. 4 mm. Hg
12.9 g. colorless oil B. P. 79–150° C. 4 mm. Hg
5.4 g. yellow oil B. P. 155–217° C. 4 mm. Hg
3.0 g. residue These distillate fractions were composed of a mixture of omega chloro carboxylic acid nitriles, $$Cl—(CH_2—CH_2)_n—CN, n$$

predominately $=1–6$.

*Example 4*

678 g. of liquid cyanogen chlorides containing 1.25% of dissolved azoisobutyric acid nitrile were pumped per hour into the top of an electrically heated reaction tube of V₂A steel having a 400 cc. volume and filled with Raschig rings of a woven V₂A wire network, from which the air had been removed. The interior temperature of the tube was maintained at 160–170° C. and a sufficient quantity of ethylene was introduced into the tube to maintain a pressure of about 130 atmospheres. The reaction product was collected in a separator connected with the bottom of the tube. After distilling off the unconverted cyanogen chloride, the reaction product was separated by vacuum distillation without a column into the following fractions:

37.5 g. nearly colorless oil B. P. 58–115° C. 11 mm. Hg
8.3 g. light yellow oil B. P. 115–132° C. 11 mm. Hg
8.3 g. light yellow oil B. P. 132–161° C. 11 mm. Hg
4.1 g. light yellow oil B. P. 161–179° C. 11 mm. Hg
19.4 g. residue.

The quantities obtained were per 678 g. of cyanogen chloride introduced into the reaction tube.

The distillates from a number of runs were combined and subjected to fractional distillation over a 1 meter Raschig column. The following fractions were obtained from 433 g. of combined distillate, having a boiling point range from 58° C. at 1 mm. Hg to 150° C. at 3 mm. Hg. Each of the first seven fractions was a colorless oil.

| g. | Percent | B. P., °C. | mm. Hg | Composition |
|---|---|---|---|---|
| 50.7 | 11.7 | 41–78 | 2 | $Cl(CH_2)_2CN + Cl(CH_2)_4CN$. |
| 105.6 | 24.4 | 78–80 | 2 | $Cl(CH_2)_4CN$. |
| 38.5 | 8.9 | 80–110 | 2 | $Cl(CH_2)_4CN + Cl(CH_2)_6CN$. |
| 96.0 | 22.2 | 92–96 | 1–1.5 | $Cl(CH_2)_6CN$. |
| 12.6 | 2.9 | 96–113 | 1.5 | $Cl(CH_2)_6CN + Cl(CH_2)_8CN$. |
| 79.5 | 18.4 | 113 | 1.5 | $Cl(CH_2)_8CN$. |
| 31.5 | 7.3 | 113–142 | 1.5–0.5 | $Cl(CH_2)_8CN + Cl(CH_2)_{10}CN$ + by-product. |
| 6.0 | 1.4 | Residue | | Mobile Oil. |
| 3.2 | 0.7 | Residue | | Solid Resin. |
| 9.4 | 2.1 | | | Distillation loss |
| 433.0 | 100.0 | | | |

The compositions of the fractions were verified by elementary analysis and by the production of derivatives, such as, omega chloro carboxylic acids, omega chloro carboxylic acid ethyl esters, omega chloro carboxylic acid anilides. The by-product found in fraction 7 was derived from the catalyst. Very slight quantities of such by-product were also contained in some of the earlier fractions.

Example 5

Over a period of 130 minutes 4800 g. of cyanogen chloride containing 60 g. of azoisobutyric acid dinitrile dissolved therein, were pumped into the top of an electrically heated reaction tube of V₂A steel 290 cm. long and 4 cm. in diameter filled with V₂A Raschig rings from which the air had been removed. The interior temperature of the reaction tube was maintained at 130–150° C. and a sufficient quantity of ethylene was introduced into the tube to maintain a pressure of about 130 atmospheres. The reaction product was collected in a separator of 0.8 liter capacity maintained at 110° C. connected to the bottom of the reaction tube and continuously withdrawn from such separator with cooling. After distilling the unconverted cyanogen chloride the reaction product was separated by vacuum distillation without a column into the following fractions:

(1) 74 g., B. P. 25–70° C., 12 mm. Hg, colorless, mobile liquid, chlorine content 37.22%.
(2) 485 g., B. P. 70–100° C., 12–2 mm. Hg, colorless, mobile liquid, chlorine content 28.75%.
(3) 519 g., B. P. 100–150° C., 2 mm. Hg, pale yellow mobile oil, chlorine content 22.35%.
(4) 70 g., B. P. 150–190° C., 2 mm. Hg, yellow mobile oil, chlorine content 15.38%.
(5) 105 g. residue, of which 70 g. was a viscous oil and the remainder solid and black.

(Fraction 1) was primarily composed of β-chloro propionitrile and δ-chlorovaleronitrile.
(Fraction 2) was primarily composed of δ-chlorovaleronitrile and 7-chlorooenanthic acid nitrile.
(Fraction 3) was primarily composed of 7-chlorooenanthic acid nitrile and 9-chloropelargonic acid nitrile.
(Fraction 4) was composed of higher ω-chloronitriles.

The same process may also successfully be applied to the conversion of other aliphatic olefins.

Example 6

25 cc. of liquid cyanogen chloride and 4.2 g. of azoisobutyric acid dinitrile were introduced into a 400 cc. autoclave of VA-steel, and the air was removed as described in Example 1. 268 cc. of liquefied isobutylene were then introduced all at once. The temperature was raised over a period of one hour to 100° C. and this temperature was maintained for four hours, whereby the pressure rose to 24 atmospheres. After cooling the autoclave, it was opened and the excess isobutylene and the unconverted cyanogen chloride were distilled, finally under vacuum at 100° C. The reaction product was a mobile liquid, orange colored oil containing substantially omega chloronitrile of the formula $Cl(C_4H_8)_nCN$, whereby $n$ was 5–6 in the average. The remainder was tetramethyl succinic acid dinitrile, formed by conversion of the azoisobutyric acid dinitrile serving as catalyst. There were no other impurities.

We claim:

1. A process for the production of omega-halogen carboxylic acid nitriles which comprises reacting a cyanogen halide selected from the group consisting of cyanogen chloride and cyanogen bromide with an aliphatic olefin in the presence of an aliphatic azo compound as a catalyst.

2. The process of claim 1 in which said cyanogen halide is cyanogen chloride.

3. The process of claim 1 in which said aliphatic olefin is ethylene.

4. The process of claim 1 in which said aliphatic azo compound is an aliphatic azo nitrile.

5. The process of claim 1 in which said aliphatic azo compound is an aliphatic azo dinitrile.

6. The process of claim 1 in which said aliphaic azo compound is an azo isobutyric acid dinitrile.

7. A process for the production of omega-halogen carboxylic acid nitriles which comprises heating a cyanogen halide selected from the group consisting of cyanogen chloride and cyanogen bromide with ethylene at subatmospheric pressure in the presence of an aliphatic azo compound as a catalyst.

8. The process of claim 7 in which the temperature employed is between about 50 and 180° C. and the pressure employed is between 50 and 500 atmospheres.

References Cited in the file of this patent

UNITED STATES PATENTS

| | | |
|---|---|---|
| 2,440,801 | Hanford et al. | May 4, 1948 |
| 2,615,915 | Ladd | Oct. 28, 1952 |
| 2,653,963 | Cowen et al. | Sept. 29, 1953 |